Oct. 21, 1969 — J. E. ELLISON — 3,473,562
WATER FAUCET SILENCING MEANS
Filed Sept. 1, 1967
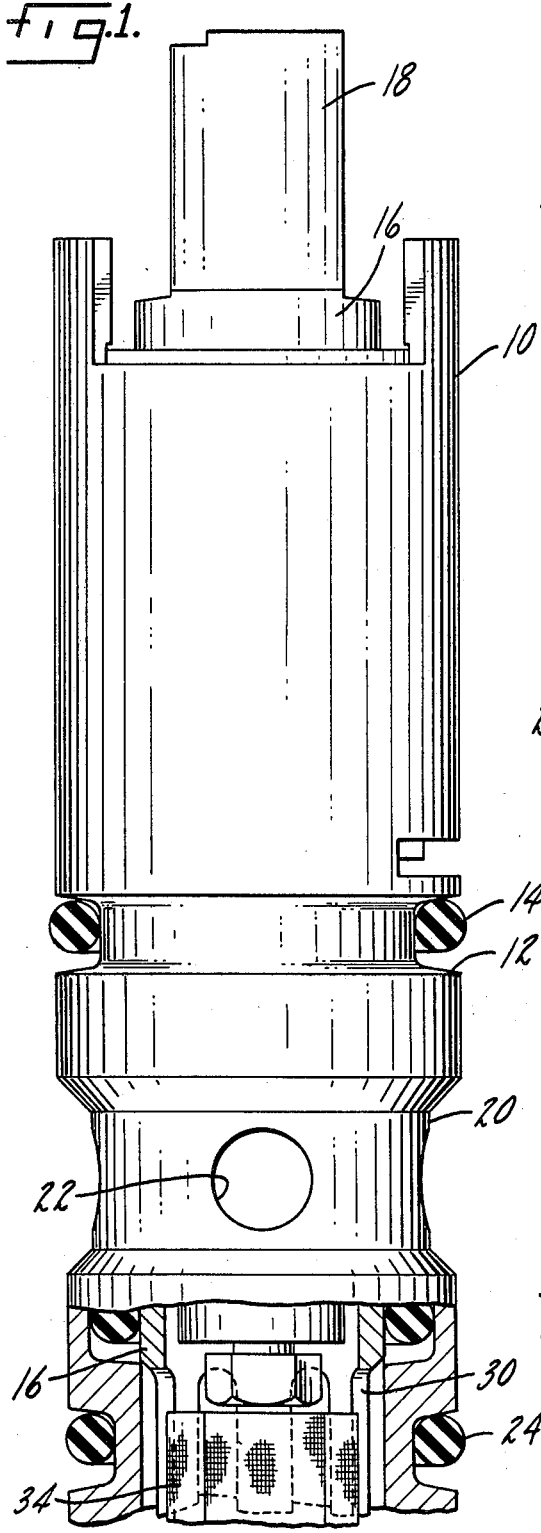
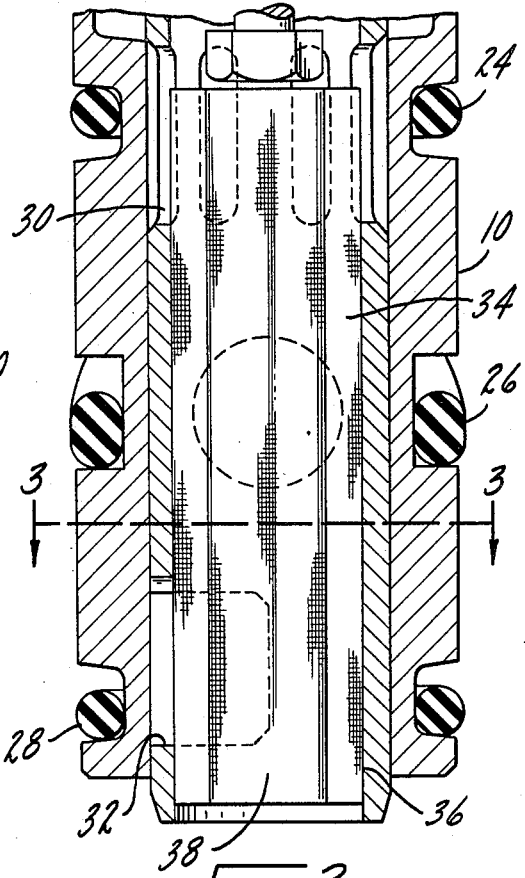
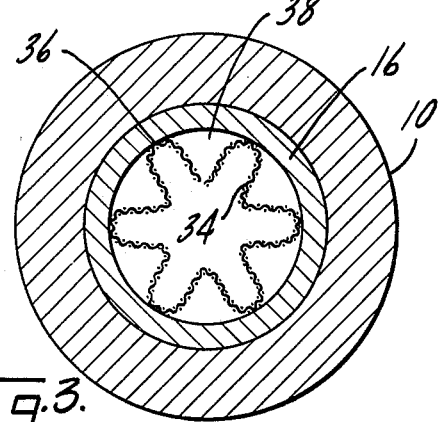
INVENTOR.
Joseph E. Ellison,
BY Parker & Carter
Attorneys.

United States Patent Office

3,473,562
Patented Oct. 21, 1969

---

3,473,562
WATER FAUCET SILENCING MEANS
Joseph E. Ellison, Amherst, Ohio, assignor to Standard Screw Company, Hartford, Conn., a corporation of New Jersey
Continuation-in-part of application Ser. No. 450,716, Apr. 26, 1965. This application Sept. 1, 1967, Ser. No. 665,088
Int. Cl. B01d; E03b 3/18, 7/07
U.S. Cl. 137—549                                   7 Claims

ABSTRACT OF THE DISCLOSURE

This invention relates to a means for silencing water noise in a mixing faucet in which hot and cold water, from separate sources, are mixed in a single chamber. In particular, the invention provides a means for joining two fluids in which the entering fluids are broken up into small droplets so as to reduce the pressures and resultant forces from their joining and hence reduce noise and turbulence.

---

This invention relates to a siliencing means for a mixing faucet and is a continuation-in-part of co-pending application Ser. No. 450,716, filed Apr. 26, 1965, now abandoned.

A principal object of the invention is a silencing means for use in a faucet of the type in which hot and cold water from separate sources are joined in a single mixing chamber.

Another purpose is a mixing faucet silencing means of the type described in which there is a bypass, from the inlet to the outlet, for particles which will not pass through the silencing screen.

Another purpose is a mixing faucet silencing means of the type described in which an irregularly shaped screen is utilized to break up the entering water forces into separate and independent water droplets.

Another purpose is a mixing faucet silencing means of the type described utilizing a generally star-shaped screen, positioned between the faucet inlet and outlet to both provide a means for breaking up the incoming water into droplets, as wel as providing the bypass for particles which will not pass through the screen.

Other purposes will appear in the ensuing specification, drawings and claims.

The invention is illustrated diagrammatically in the following drawings wherein:

FIGURE 1 is a partial axial cross section of a portion of a mixing faucet of the type described.

FIGURE 2 is an axial cross section showing the remaining portion of the mixing faucet of FIGURE 1, and FIGURE 3 is a section along plane 3—3 of FIGURE 2.

One common type of mixing faucet uses a single lever to control both volume and temperature of the water discharge. Such faucets bring together liquid from two sources to a common outlet. Unless the joining of fluids, from the hot and cold water sides of the system, can be smoothly accomplished, the kinetic forces contained in the non-compressible fluids will cause turbulence and noise. As the pressures of the joining fluids and resultant forces increase, and if the area or point where the fluids come together is restricted, noise will develop in proportion to the size of the joining area.

The present invention utilizes a fine mesh screen at the inlets of such a mixing faucet to break up the entering fluids into small droplets. Such droplets pass through the screen, and make the necessary changes in direction in the mixing valve with greatly reduced turbulence. The difference between two firm streams of water meeting and the meeting of a multitude of droplets of water is much like the meeting of solid iron bars as contrasted with the meeting of equal weights of fine iron shot. Even through the total weight of iron meeting, or the total forces of water meeting, are the same, by breaking the water into droplets, the actual forces involved between meeting particles or droplets of water provides greatly reduced turbulence and noise.

It has been determined that it is not satisfactory to completely cover the inlet means with such a screen, as the screen will clog with minute particles such as sand, which are inherent in any water system. Accordingly, a bypass should be provided, so that incoming particles in the water streams may flow to the faucet outlet without clogging the silencing screen. The present invention provides a star-shaped screen or a screen with a plurality of generally parallel passages, outside of the screen, but yet between the inlet and outlet. Because of the relative positions of the inlet means and the screen, and the fact that the water will be directed generally perpendicular to the screen, substantially all of the water will go through the screen. It is only the particles such as sand, gravel and the like, which cannot penetrate the screen, that will be drawn by the force of the moving water from the inlet to the outlet, but outside of the silencing screen.

Such a screen arrangement may be used in a multitude of mixing faucets and obviously the invention should not be limited to a particular type or style of faucet. However, as shown herein, the invention is applied to a faucet of the general type disclosed in U.S. Patent Re. 25,920.

The drawings show the faucet valve, but not the faucet housing and spout. Obviously, the housing and spout may take a variety of forms and the invention should not be limited to any particular configuration.

The faucet valve may include an outer sleeve 10 having a groove 12 for a seal ring 14. There is a rotatable and reciprocal stem 16 within the sleeve 10 and the handle receiving end 18 of the stem 16 is illustrated at the top of FIGURE 1. The sleeve 10 may have a cut-away or recessed portion 20 with a plurality of outlet ports 22. That portion of the sleeve 10 below the outlet ports 22 has been shown in section to illustrate the silencing means which is the subject of this invention. There may be further grooves and seal rings in the sleeve 10 for providing a firm seal between the exterior of the sleeve and the interior of the faucet housing. Such seal rings are indicated at 24, 26 and 28.

As illustrated particularly in FIGURE 2, the stem 16 may be hollow and there may be a plurality of slots 30, near the top of that portion of the structure shown in FIGURE 2, which slots provide the water outlet from the interior of the hollow stem 16. Upward movement of the stem places the slots 30 in alignment and communication with the ports 22. The sleeve 10 may have both hot and cold water inlet ports, one of which is shown in dotted lines, which are conventionally placed at diametrically opposed portions of the sleeve 10. The hollow stem 16 may have an arcuately shaped cut-away section 32 which provides the water inlet means. Reciprocation of the stem from its illustrated closed position will bring the inlet area 32 to the level of the sleeve inlet ports and rotation of the stem is effective to place the inlet area 32 into communication with one or both of the inlet ports. The invention should not be limited to a single cut-away portion for the inlet means of the stem 16, as there may be separate ports, or separate openings, closely spaced together. What is important is that there be some means for mixing the desired volumes of hot and cold water in the mixing chamber within stem 16.

Within the hollow steam 16 is a star-shaped screen 34 which extends from below the cut-away inlet means 32 up to nearly the top of the slots 30 which form the water outlet. Turning particularly to FIGURE 3, note that there is longitudinal contact, as at 36, between the exterior of the screen 34 and the interior surface of the hollow stem 16. In between the peripherally, generally equally spaced points of contact 36 there are longitudinally extending passages 38 which can place the inlet means 32 in direct communication with the outlet slots 30.

The invention should not be limited to any particular screen or screen means or to any particular configuration for the screening means. What is important in the invention is to provide an arrangement or a structure which will break up the water entering the cut-away portion 32 into droplets so that the forces from the joining hot and cold water streams can smoothly come together with a minimum of turbulence and noise. As stated above, normally the hot and cold water inlet ports in the sleeve 10 would be at diametrically opposed units. Accordingly, these two streams of water will be opposing one another when they join together. Conventionally, such joining creates noise within the faucet. The screen 34 breaks up the streams of water into droplets which can be easily joined with greatly reduced noise. Not only does the screen 34 provide a means for silencing water turbulence, but the passages 38, which join the inlet means 32 with the outlet slots 30, will provide a bypass for any particles which may be in the water. Without such a bypass, the screen 34 could be easily clogged and then useless.

Normally, substantially all of the incoming water will pass radially inward through the screen, be then directed upwardly inside of the screen, and then pass radially outward through the screen to the slots 30.

The particular mesh of the screen 34 may vary widely and the finer the mesh, the more the noise will be reduced. On the other hand, the screen must not provide an obstruction to the passage of water to the extent that there will be a back pressure created by the presence of the screen. The screen must perform its function of breaking up the water without obstructing free flow of the water through the valve.

Whereas the preferred form of the invention has been shown and described herein, it should be realized that there are many modifications, substitutions and alterations thereto.

I claim:

1. In a mixing faucet, a valve member, hot and cold water inlet means in said valve member, a mixing chamber in said valve member with said hot and cold water inlet means opening into said mixing chamber, at least one water outlet in said valve member spaced from said hot and cold water inlet means, said outlet being in communication with said mixing chamber, and screen means within said mixing chamber interposed between said hot and cold water inlet means and said outlet and positioned opposite said hot and cold water inlet means for changing the entering water into small droplets which flow through the screen means to the outlet, said screen means cooperating with the interior of said valve member to define at least one fluid path from the inlet means to the outlet outside of said screen means for particles which will not pass through said screen means.

2. The structure of claim 1 further characterized in that said screen means and valve member define a plurality of parallel passages outside of the screen means and between said inlet means and the outlet.

3. The structure of claim 1 further characterized in that said screen means includes peripherally spaced portions in contact with the interior of said valve member, with the spaces between said peripherally spaced contacting portions defining paths, outside of the screen means, between said inlet means and the outlet.

4. The structure of claim 3 further characterized in that said peripherally spaced portions are generally equally spaced.

5. The structure of claim 1 further characterized in that said screen means has a generally star-shaped cross section.

6. The structure of claim 5 further characterized in that the outer peripheral portions of said star-shaped screen means are in contact with the interior of said valve member.

7. The structure of claim 6 further characterized in that said screen means extends longitudinally in said valve member from the inlet means to the outlet.

References Cited

UNITED STATES PATENTS

| Re. 25,920 | 11/1965 | Moen | 137—625.41 X |
|---|---|---|---|
| 1,092,043 | 3/1914 | Hammond | 137—549 |
| 1,958,073 | 5/1934 | Seidel | 137—549 X |
| 2,194,163 | 3/1940 | Dahl | 181—33.9 X |
| 3,243,010 | 3/1960 | Flynn | 181—55 X |

FOREIGN PATENTS

| 55,659 | 9/1935 | Norway. |
|---|---|---|

WILLIAM F. O'DEA, Primary Examiner

D. H. LAMBERT, Assistant Examiner

U.S. Cl. X.R.

137—604; 181—36; 239—553.3, 590.3